US010878071B2

(12) United States Patent
Adir et al.

(10) Patent No.: US 10,878,071 B2
(45) Date of Patent: Dec. 29, 2020

(54) BIOMETRIC AUTHENTICATION ANOMALY DETECTION

(71) Applicant: International Business Machines Corporation, Armonk, NY (US)

(72) Inventors: Allon Adir, Kiryat Tiveon (IL); Lev Greenberg, Haifa (IL); Omri Soceanu, Haifa (IL)

(73) Assignee: International Business Machines Corooration, Armonk, NY (US)

( * ) Notice: Subject to any disclaimer, the term of this patent is extended or adjusted under 35 U.S.C. 154(b) by 141 days.

(21) Appl. No.: 16/167,570

(22) Filed: Oct. 23, 2018

(65) Prior Publication Data
US 2020/0125706 A1  Apr. 23, 2020

(51) Int. Cl.
G06F 21/00 (2013.01)
G06F 21/32 (2013.01)
H04L 29/06 (2006.01)
H04L 9/32 (2006.01)

(52) U.S. Cl.
CPC ............ G06F 21/32 (2013.01); H04L 9/3231 (2013.01); H04L 63/102 (2013.01); H04L 63/0861 (2013.01)

(58) Field of Classification Search
CPC ..... G06F 21/32; H04L 63/102; H04L 9/3231; H04L 63/0861
See application file for complete search history.

(56) References Cited

U.S. PATENT DOCUMENTS 7,486,810 B1  2/2009  Accapadi
8,922,342 B1  12/2014  Ashenfelter et al.
9,323,912 B2  4/2016  Schultz et al.
9,792,420 B2  10/2017  Uno et al.
9,892,576 B2  2/2018  Kursun et al.
(Continued)

FOREIGN PATENT DOCUMENTS

WO   2010150146   2/2011

OTHER PUBLICATIONS

Tinny Magbile et al., "Anomaly Based Intrusion Detection for a Biometric Identification System using Neural Networks", Planetary Scientific Research Centre, Oct. 6-7, 2012, Dubai (UAE).
(Continued)

*Primary Examiner* — Brandon S Hoffman
*Assistant Examiner* — William A Corum, Jr.
(74) *Attorney, Agent, or Firm* — Roy S. Melzer

(57) ABSTRACT

A computer implemented method of authenticating a user based on comparison of biometric data authentication process parameters measured during a biometric authentication process against a biometric signature authentication process model of the user, comprising receiving sensory data captured by one or more sensors operated to capture biometric data of a user during a biometric authentication process conducted to verify a biometric signature of the user, calculating a deviation of values of a plurality of authentication process parameters measured during analysis of the sensory data from the values of corresponding reference authentication process parameters retrieved from a biometric signature authentication process model of the user and authenticating the user based on verification of the biometric signature and according to the deviation.

16 Claims, 3 Drawing Sheets

(56) References Cited

U.S. PATENT DOCUMENTS

| | | | | |
|---|---|---|---|---|
| 2002/0138743 | A1* | 9/2002 | Murakami | G07C 9/257 |
| | | | | 713/186 |
| 2009/0232361 | A1* | 9/2009 | Miller | G06K 9/6293 |
| | | | | 382/115 |
| 2014/0152424 | A1* | 6/2014 | Steven | G07C 9/37 |
| | | | | 340/5.82 |
| 2015/0180866 | A1* | 6/2015 | Hama | G06F 21/32 |
| | | | | 726/6 |
| 2015/0242605 | A1 | 8/2015 | Du et al. | |
| 2015/0310444 | A1* | 10/2015 | Chen | G06Q 20/3226 |
| | | | | 705/44 |
| 2015/0347734 | A1* | 12/2015 | Beigi | H04L 9/3263 |
| | | | | 713/155 |
| 2015/0358317 | A1* | 12/2015 | Deutschmann | H04W 12/0605 |
| | | | | 713/186 |
| 2016/0006730 | A1* | 1/2016 | Chari | H04L 63/0861 |
| | | | | 726/7 |
| 2016/0171198 | A1* | 6/2016 | John Archibald | G06F 21/577 |
| | | | | 726/19 |
| 2016/0225048 | A1 | 8/2016 | Zoldi et al. | |
| 2016/0259924 | A1 | 9/2016 | Dutt et al. | |
| 2016/0292536 | A1* | 10/2016 | Irie | G06K 9/6215 |
| 2017/0161478 | A1* | 6/2017 | Stavrou | G06F 21/316 |
| 2018/0046787 | A1* | 2/2018 | Armando | G06F 21/316 |
| 2018/0137331 | A1* | 5/2018 | Miyoshino | G06K 9/6211 |
| 2019/0044942 | A1* | 2/2019 | Gordon | G06K 9/00885 |
| 2019/0370448 | A1* | 12/2019 | Devine | G06F 21/316 |
| 2020/0004940 | A1* | 1/2020 | Cho | H04W 12/00504 |
| 2020/0044852 | A1* | 2/2020 | Streit | G06N 20/00 |
| 2020/0053118 | A1* | 2/2020 | Leng | H04L 63/1466 |
| 2020/0053558 | A1* | 2/2020 | Hallock | G06N 20/00 |
| 2020/0065569 | A1* | 2/2020 | Nduka | G06K 9/2036 |
| 2020/0125706 | A1* | 4/2020 | Adir | G06F 21/32 |

OTHER PUBLICATIONS

P. Prabhusundhar et al., "Identification of Biometric-Based Continuous user Authentication and Intrusion Detection System for Cluster Based Manet", International Journal on Recent and Innovation Trends in Computing and Communication, Mar. 2016, vol. 4, Issue 3, pp. 207-213.

Hataichanok Saevanee et al., "Continuous user authentication using multi-modal biometrics", Computers & Security, 2015, vol. 53, pp. 234-246.

* cited by examiner

BIOMETRIC AUTHENTICATION ANOMALY DETECTION

BACKGROUND

The present invention, in some embodiments thereof, relates to authenticating a user according to his biometric signature, and, more specifically, but not exclusively, to authenticating a user according to his biometric signature and a comparison of biometric data authentication process parameters measured during the biometric authentication process against a biometric signature authentication process model of the user.

Biometric authentication has become widely used for a plurality of secure applications, systems and platforms requiring secure access and therefore need to verify the identity of a person attempting to access the secure resource before granting that person access.

Biometric authentication is based on generating a biometric signature representing the person's physical and physiological characteristics and/or attributes. During a biometric authentication process, biometric data of the person captured by sensors may be analyzed to identify the person's physical and physiological characteristics and/or attributes and verify them against the biometric signature associated with that person.

The biometric authentication may be utilized using one or more of a plurality of biometric verification technologies, methods, systems and techniques, for example, fingerprint matching, face recognition, iris recognition, retinal matching, ear matching, voice recognition, hand written signature matching and/or the like. The sensors deployed to capture the biometric data as well as the analysis tools applied to analyze the captured biometric data naturally depend on the type of the biometric verification technology(s).

SUMMARY

According to a first aspect of the present invention there is provided a computer implemented method of authenticating a user based on comparison of biometric data authentication process parameters measured during a biometric authentication process against a biometric signature authentication process model of the user, comprising using one or more processors for:

Receiving sensory data captured by one or more sensors operated to capture biometric data of a user during a biometric authentication process conducted to verify a biometric signature of the user.

Calculating a deviation of values of a plurality of authentication process parameters measured during analysis of the sensory data from the values of corresponding reference authentication process parameters retrieved from a biometric signature authentication process model of the user.

Authenticating the user based on verification of the biometric signature and according to the deviation.

Enhancing the biometric authentication process based on deviation of the authentication process parameters measured during the authentication process may significantly improve robustness and immunity of the authentication process to exploitations directed to misleading the authentication system to believe the biometric data is captured from a legitimate user while in fact it is provided by a fraudulent source. Analyzing the sensory data capturing and analysis processes may convey a lot of information relating to the user thus validating the source for the captured sensory data is indeed the legitimate user.

According to a second aspect of the present invention there is provided a system for authenticating a user based on comparison of biometric data authentication process parameters measured during a biometric authentication process against a biometric signature authentication process model of the user, comprising a program store storing a code and one or more processors coupled to the program store for executing the stored code, the code comprising:

Code instructions to receive sensory data captured by one or more sensors operated to capture biometric data of a user during a biometric authentication process conducted to verify a biometric signature of the user.

Code instructions to calculate a deviation of values of a plurality of authentication process parameters measured during analysis of the sensory data from the values corresponding reference authentication process parameters retrieved from a biometric signature authentication process model of the user.

Code instructions to authenticate the user based on verification of the biometric signature and according to the deviation.

According to a third aspect of the present invention there is provided a computer program product for authenticating a user based on comparison of biometric data authentication process parameters measured during a biometric authentication process against a biometric signature authentication process model of the user, comprising:

A non-transitory computer readable storage medium.

First program instructions for receiving sensory data captured by one or more sensors operated to capture biometric data of a user during a biometric authentication process conducted to verify a biometric signature of the user.

Second program instructions for calculating a deviation of values of a plurality of authentication process parameters measured during analysis of the sensory data from the values of corresponding reference authentication process parameters retrieved from a biometric signature authentication process model of the user.

Third program instructions for authenticating the user based on verification of the biometric signature and according to the deviation.

Wherein the first, second and third program instructions are executed by one or more processors from the non-transitory computer readable storage medium.

In a further implementation form of the first, second and/or third aspects, the biometric signature is verified using one or more biometric verification technologies which are members of a group consisting of: fingerprint matching, face recognition, iris recognition, retinal matching, ear matching, voice recognition and hand written signature matching. Supporting a wide range of biometric signature verification techniques may significantly increase adoption of the enhanced biometric authentication process by a plurality of methods, systems, application, platforms and/or the like which may use various such biometric signature verification techniques.

In a further implementation form of the first, second and/or third aspects, each of the plurality of authentication process parameters is a member of a group consisting of: a parameter relating to one or more features of the biometric signature extracted from the sensory data, one or more intermediary features extracted from the sensory data, a parameter of interaction with the user during the biometric authentication process and an execution flow attribute of one or more of the processors during the biometric authentication process. Each of the authentication process parameters may be indicative of different aspects of the authentication process and hence collecting a wide range of authentication process parameters of various types may significantly improve accuracy of the calculated deviation and hence improve accuracy of the estimation whether the authentication process is conducted by the legitimate user or not.

In an optional implementation form of the first, second and/or third aspects, the deviation is calculated according to a weighted value of one or more of the at least some authentication process parameters, the weighted value is expressing an adjusted of the value according to a respective weight indicative of a significance of the respective authentication process parameter to verification of acquisition of the biometric signature. Different authentication process parameters may have different contribution and/or significance to the overall aggregated deviation. Moreover the contribution and/or significance of one or more of the authentication process parameters may deviate between different users. Therefore assigning weights to the authentication process parameters may further improve tuning the method and system to each user in order to further increase robustness, accuracy and/or immunity of the authentication process.

In a further implementation form of the first, second and/or third aspects, the biometric signature authentication process model is initially constructed for the biometric authentication process during a first biometric authentication process following an enrollment process conducted by the user.

In an optional implementation form of the first, second and/or third aspects, the biometric signature authentication process model is adjusted according to one or more of a plurality of authentication process parameters measured during analysis of the sensory data captured during one or more subsequent biometric authentication processes following the first biometric authentication process. Constantly enhancing the biometric signature authentication process model during multiple authentication processes may significantly improve its accuracy, consistency and/or correspondence with then user.

In an optional implementation form of the first, second and/or third aspects, one or more weights associated with respective authentication process parameters are automatically adjusted. The weight(s) indicative of a significance of the respective authentication process parameter to verification of acquisition of the biometric signature is adjusted according to one or more of a plurality of authentication process parameters measured during analysis of the sensory data captured during at least one subsequent biometric authentication process following the first biometric authentication. Constantly enhancing the biometric signature authentication process model during multiple authentication processes may significantly improve its accuracy, consistency and/or correspondence with then user.

In a further implementation form of the first, second and/or third aspects, the deviation is calculated by calculating a distance between the value measured for each of at least some of the plurality of authentication process parameters and the value of the corresponding reference authentication process parameter.

In a further implementation form of the first, second and/or third aspects, the biometric signature authentication process model is utilized by one or more machine learning models trained to identify a deviation of the values of the plurality of authentication process parameters. The machine learning model(s) learns to identify the deviation during a training process in which the machine learning model(s) is trained with a plurality of training datasets comprising simulation sensory data representative of sensory data captured during a plurality of biometric authentication processes of the user.

In a further implementation form of the first, second and/or third aspects, one or more of the machine learning model(s) is a member of a group consisting of: a neural network, a Support Vector Machine (SVM) and/or the like.

In a further implementation form of the first, second and/or third aspects, each of the plurality of training datasets is annotated with a label indicating success or failure of the biometric authentication process based on the verification of the sensory data of the respective training dataset.

In an optional implementation form of the first, second and/or third aspects, calculating the deviation is done by applying one or more of the machine learning models to at least some features of one or more (other) neural networks used to verify the biometric signature.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
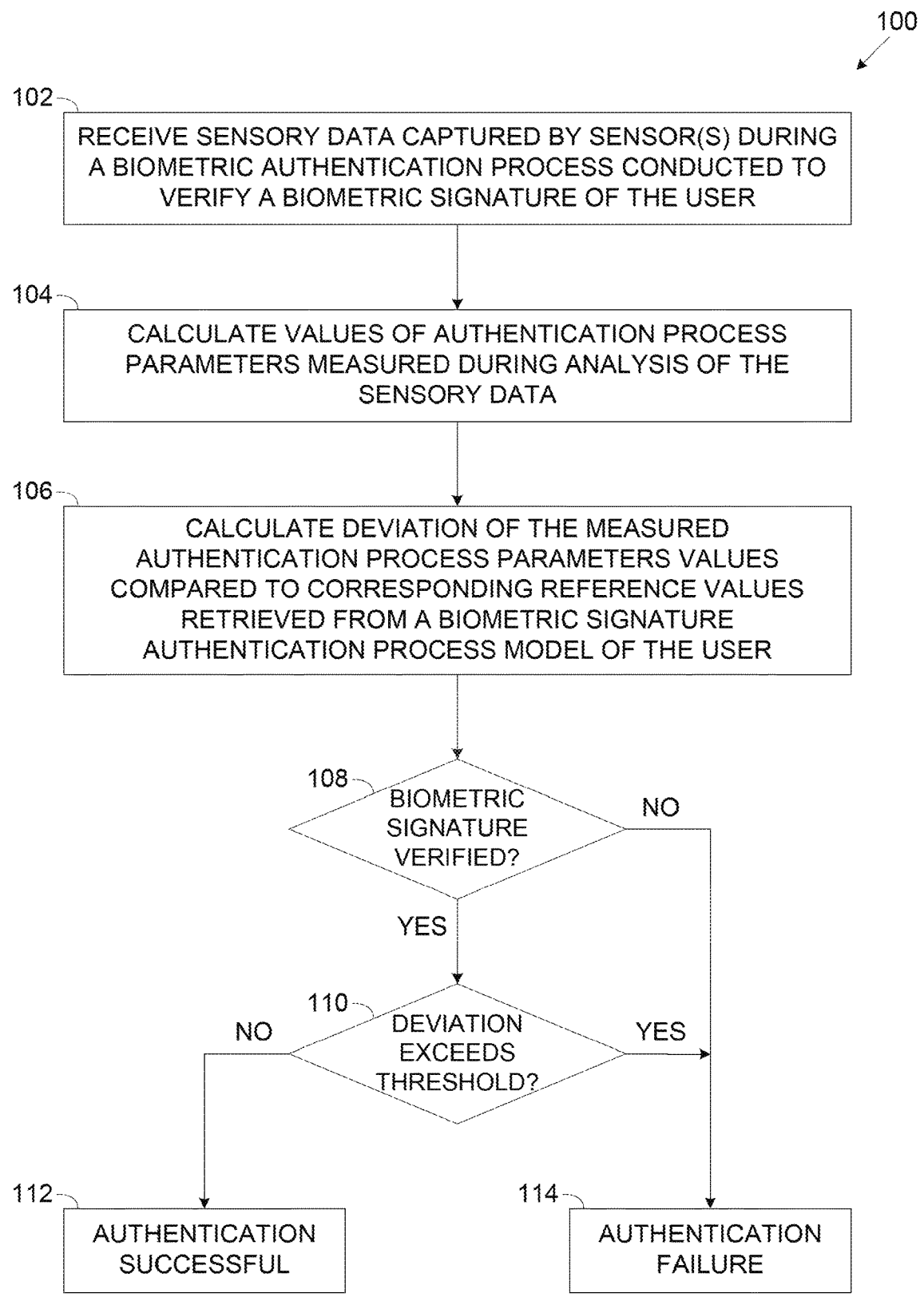
FIG. 1 is a flowchart of an exemplary process of authenticating a user based on comparison of biometric data authentication process parameters measured during a biometric authentication process against a biometric signature authentication process model of the user, according to some embodiments of the present invention.

The present invention, in some embodiments thereof, relates to authenticating a user according to his biometric signature, and, more specifically, but not exclusively, to authenticating a user according to his biometric signature and a comparison of biometric data authentication process parameters measured during the biometric authentication process against a biometric signature authentication process model of for the user.

According to some embodiments of the present invention, there are provided methods, systems and computer program products for enhancing biometric authentication of users attempting to access a secure resource based on comparison of biometric data authentication process parameters measured during a biometric authentication process against a biometric signature authentication process model created for each user.

The secure resource may be an application specific terminal, device, system and/or platform requiring authentication of the user, for example, a passport control system, an Automated Teller Machine (ATM), an automated kiosk, a vending machine, a door digital lock and/or the like. The secure resource may also be a general purpose device, for example, a Smartphone, a tablet, a handheld computer, a laptop computer, a desktop computer and/or the like executing one or more secure applications requiring authentication of the user, for example, a device login (unlock), a digital wallet, a banking application, a shopping application and/or the like. The secure applications may further include one or more secure web sites requiring authentication of the user, for example, a bank account website, a credit card website, a private website and/or the like.

The biometric authentication process may be utilized through one or more biometric verification technologies for verifying a biometric signature of the user, for example, fingerprint matching, face recognition, iris recognition, retinal matching, ear matching, voice recognition, hand written signature matching and/or the like. During the biometric authentication process, sensory data, specifically biometric data of the user may be captured by one or more sensors, in particular, sensor(s) adapted to the selected biometric verification technology(s), for example, an imaging sensor (e.g. a camera, a video camera, etc.), an audio sensor (e.g. a microphone, etc.), a fingerprint scanner, a tactile sensor (e.g. a touch pad, a touch screen, etc.) and/or the like.

The captured biometric data may be analyzed and compared to one or more biometric signatures associated with the user, for example, a fingerprint, a face pattern, an iris pattern, a retinal pattern, an ear pattern, a voice pattern and/or the like.

The biometric authentication may be enhanced by measuring one or more biometric data authentication process parameters during the analysis of the captured biometric data. The authentication process parameters may relate to one or more features extracted from the biometric data for verifying the biometric signature of the user. The authentication process parameters may also relate to one or more intermediary features which may be extracted from the sensory data during the analysis of the biometric data but may not necessarily be used for the verification of the biometric signature. The authentication process parameters may also relate to one or more interaction characteristics identified for the interaction of the user with the sensor(s) during the biometric authentication process. The authentication process parameters may further relate to one or more execution flow attributes of the analysis of the biometric data and the verification of the biometric signature.

The measured biometric data authentication process parameters may be compared to corresponding reference authentication process parameters defined by a biometric signature authentication process model created, adjusted, configured and customized for each user. A deviation of the measured authentication process parameters from the reference authentication process parameters may be calculated to increase reliability, accuracy and/or integrity of the biometric authentication process.

Optionally, one or more of the authentication process parameters are assigned a respective weight to indicate a significance of the respective authentication process parameter to the verification of acquisition and analysis of the biometric signature. As such, authentication process parameters having higher significance, reliability, consistency and/or the like may be assigned with larger weights to increase their contribution to the overall deviation. In contrast, authentication process parameters having lesser significance, reliability, consistency and/or the like may be assigned with smaller weights to reduce their contribution to the overall deviation.

In case the biometric signature of the user is verified and the deviation of the measured authentication process parameters from the reference authentication process parameters complies with a predefined deviation measure, for example, a threshold, the user may be successfully authenticated and may be granted access to the secure resource. However, in case the measured authentication process parameters are incompliant with the reference authentication process parameters defined by the biometric signature authentication process model, the authentication may fail even if the biometric signature is verified.

The biometric signature(s) of the user may be created during an enrollment process conducted by the user for enrolling (registering) for the service and/or device accessed by the secure resource. During the enrollment process, the biometric data of the user is captured to create the biometric signature(s) for the user. The biometric signature authentication process model however may be created for the user during a first authentication process conducted for the user following the enrollment process. The authentication process the captured biometric data is analyzed and the authentication process parameters may be measured and defined in the biometric signature authentication process model as the reference authentication process parameters. The weights assigned to one or more of the authentication process parameters may also be defined based on the analysis of the biometric data captured during the enrollment process.

Optionally, one or more of the reference authentication process parameters and optionally the weight assigned to one or more of the authentication process parameters are updated, adjusted and/or adapted according to the analysis of the biometric data captured during one or more subsequent biometric authentication process following the enrollment process.

According to some embodiments of the present invention the deviation may be calculated as a distance (difference) between the measured authentication process parameters and the reference authentication process parameters defined by the biometric signature authentication process model of the user.

According to some embodiments of the present invention the deviation of the measured authentication process parameters from the reference authentication process parameters is calculated and/or determined using one or more trained machine learning models and/or algorithms for example, a neural network, a Support Vector Machines (SVM) and/or the like. The neural network(s) may be implemented using one or more neural network implementations, for example, a Deep Neural Network (DNN), a Feedforward neural network (e.g. convolutional neural networks, time delay neural networks, etc.), a Recurrent Neural Networks (RNN), a Radial Basis Function (RBF) and/or the like. The machine learning model(s) may be adapted and customized for the user by training it with a plurality of training datasets comprising simulation sensory data (biometric data) representative of sensory data captured during a plurality of biometric authentication processes of the (specific) user. During the training, the machine learning model(s) may adjust according to corresponding authentication process parameters detected and measured during analysis of the simulation sensory data such that the machine learning model(s) facilitates the biometric signature authentication process model. For example, during the training session, the neural network(s) may adjust its layers, nodes and/or weights according to the corresponding authentication process parameters detected during analysis of the simulation sensory data. In another example, during the training session, the SVM(s) may adjust according to corresponding authentication process parameters detected and measured during analysis of the simulation sensory data. During the biometric authentication process, the trained machine learning model(s) may be applied to the measured authentication process parameters and the output of the machine learning model(s) may be analyzed to calculate and/or determine the deviation. In another example, Moreover, the machine learning model(s) may automatically adjust weight(s) associated with respective authentication process parameter(s) according to the values measured for at least some of the authentication process parameter(s) during one or more of the subsequent authentication processes succeeding the training session.

Enhancing the biometric authentication may present significant advantages and benefits compared to existing methods and systems for biometric authentication of users.

First, the enhanced biometric authentication is directed to measuring and evaluating the biometric data acquisition and analysis processes during the authentication session rather than to the outcome of the biometric data acquisition used for verifying the biometric signature as may be done by the existing methods. The existing methods and systems may typically analyze the captured biometric data to produce a final biometric signature (outcome) that is compared with the stored biometric signature associated with the user. Such methods and systems may be compromised by a malicious party using one or more objects, measures and/or techniques for impersonating as a legitimate user. For example, a fingerprint of the user may be copied (e.g. using adhesive tape, etc.) and presented to the fingerprint scanner which may capture the fingerprint as if it was the real fingerprint of the user. The copied fingerprint may be analyzed and verified as genuine by the system which may be oblivious to the fact that the fingerprint is copied. In another example, a picture of the user's face may be presented to the imaging sensor(s) and the captured images may be analyzed to verify the picture as genuine since again the system may be oblivious to the fact that the captured biometric data depicts the user's picture. Enhancing the biometric authentication by analyzing the biometric data acquisition and analysis parameters and verifying these parameters against the biometric authentication process model created specifically for each user may overcome such limitations. The authentication process parameters describing the biometric data acquisition and analysis process (rather than outcome) may be highly indicative of multiple subtle, intermediate and/or additional characteristics and/or attributes of the biometric data capture and analysis processes. As such, deception measured imitating the user may be identified thus significantly increasing reliability, integrity and/or robustness of the biometric authentication process.

Moreover, automatically adjusting (tailoring) and customizing the biometric signature authentication process model per user may allow significantly enhancing accuracy of the biometric authentication since characteristics and/or attributes that are typical and characteristic to the biometric data capture and analysis processes conducted for the specific user(s) may be identified and verified.

Furthermore, the machine learning model(s) such as the neural network(s) and/or the SVM(s) used for identifying the deviation of the authentication process parameters per user may continuously evolve to adapt and/or fine tune themselves and hence fine tune the reference authentication process parameters as identified for the user over time to further increase accuracy of the biometric authentication.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of authenticating a user based on comparison of biometric data authentication process parameters measured during a biometric authentication process against a biometric signature authentication process model of the user, according to some embodiments of the present invention. An exemplary process 100 may be executed for authenticating (an identity) of a user based on verification of a biometric signature of the user identified by analyzing sensory data captured by one or more sensors adapted to capture biometric data of the user during a biometric authentication process. Authentication of the user's identity is further based on comparing one or more of a plurality of biometric data authentication process parameters measured during the biometric authentication process against a biometric signature authentication process model of the user.

In case the biometric signature of the user is verified and the measured authentication process parameters comply with the biometric signature authentication process model, the authentication is successful. Otherwise, in case the measured authentication process parameters are incompliant with the biometric signature authentication process model, the authentication may fail even if the biometric signature is verified.

Figure 2A:
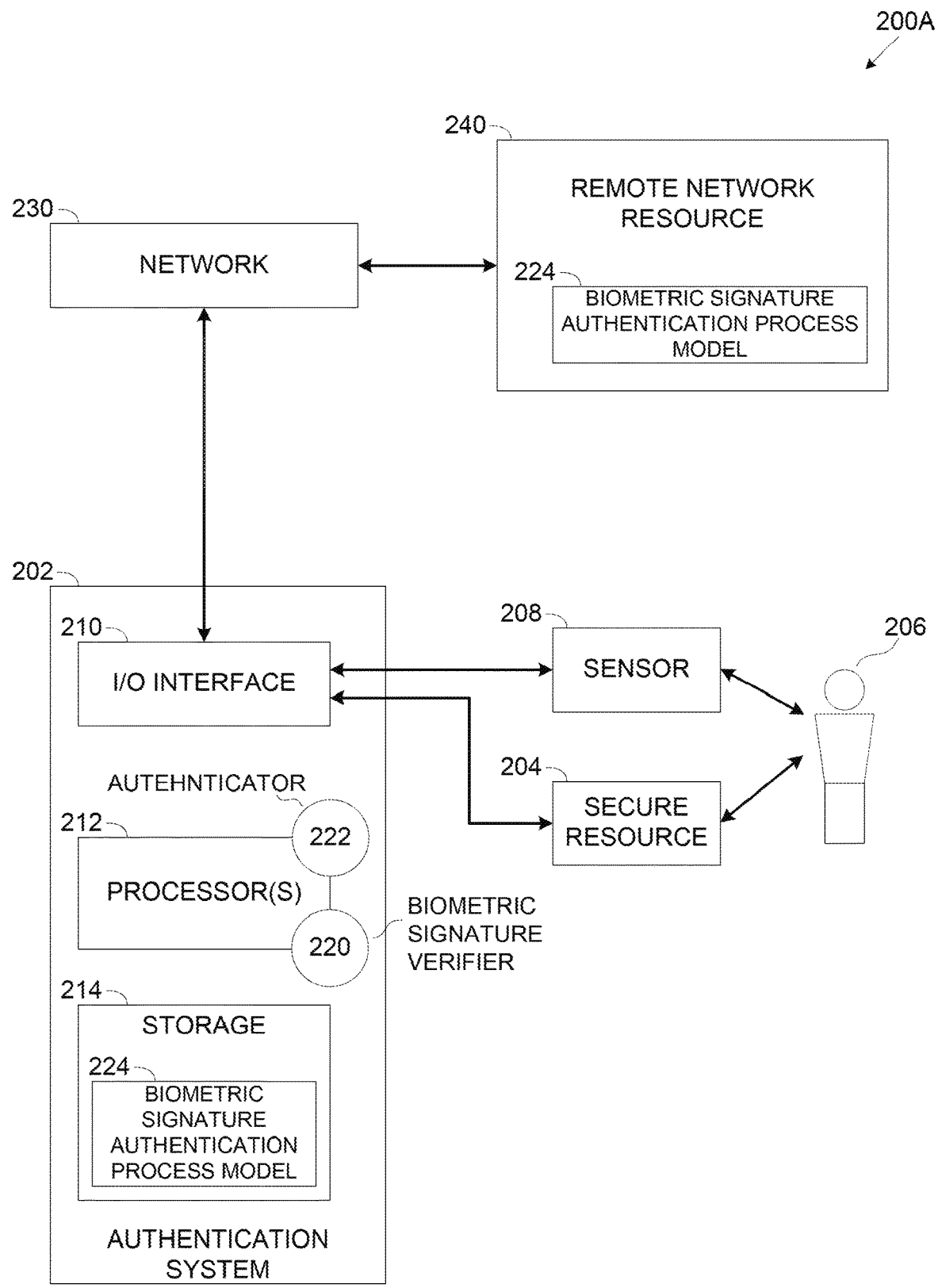
FIG. 2A and FIG. 2B are schematic illustration of exemplary embodiments of a system for authenticating a user based on comparison of biometric data authentication process parameters measured during a biometric authentication process against a biometric signature authentication process model of the user, according to some embodiments of the present invention.
Figure 2B:
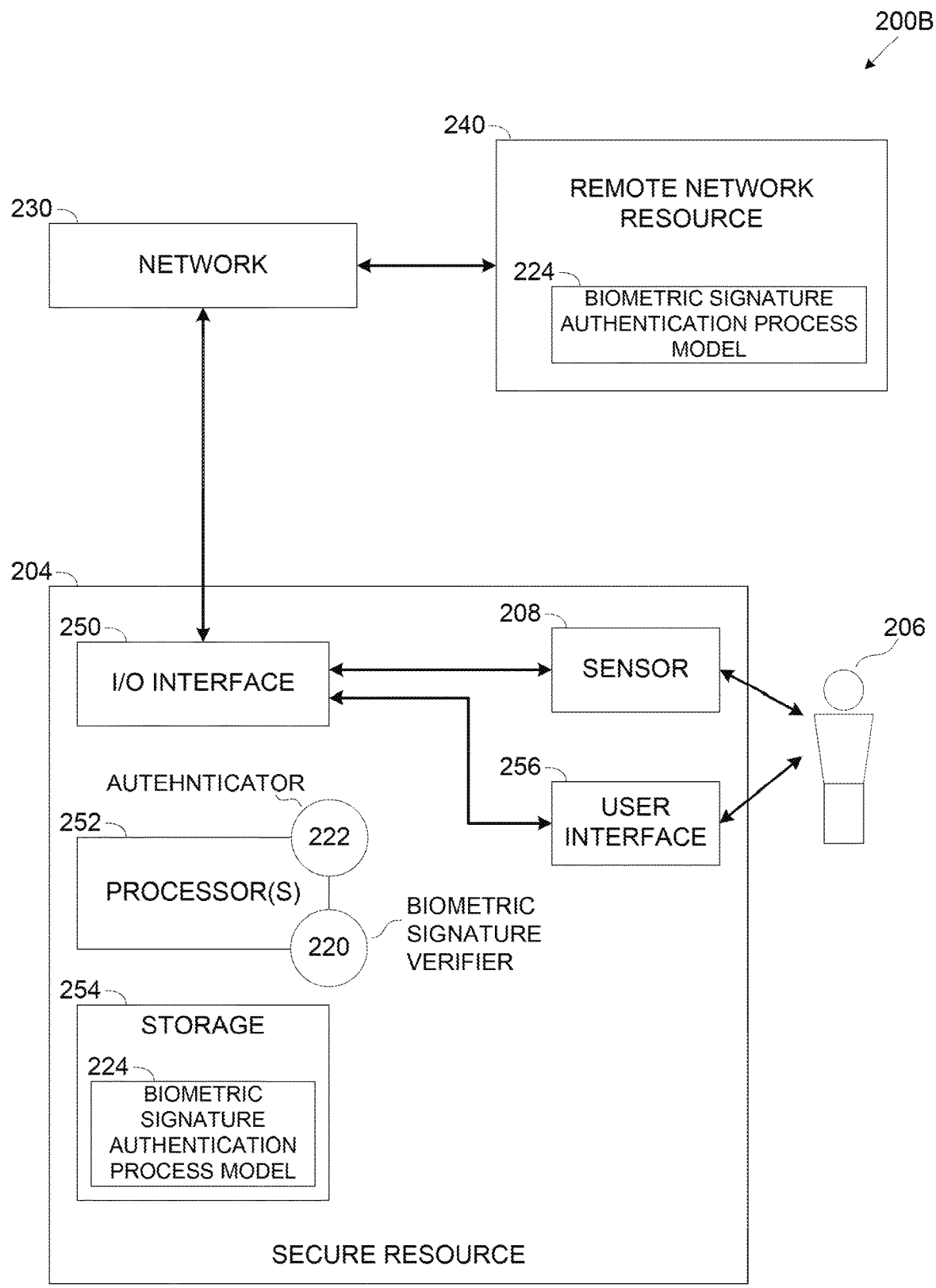

Reference is also made to 2A and FIG. 2B, which are schematic illustration of exemplary embodiments of a system for authenticating a user based on comparison of biometric data authentication process parameters measured during a biometric authentication process against a biometric signature authentication process model of the user, according to some embodiments of the present invention. Exemplary systems 200A and 200B may be used to execute a process such as the process 100 for authenticating a biometric signature of a user 206 attempting to access a secure resource 204 requiring authentication of the user 206 in order to grant the user 208 access to the secure terminal 204.

The secure resource 204 may be an application specific terminal, device, system and/or platform requiring authentication of the user 206, for example, a passport control system, an ATM, an automated kiosk, a vending machine, a door digital lock and/or the like. The secure resource 204 may also be a general purpose device, for example, a Smartphone, a tablet, a handheld computer, a laptop computer, a desktop computer and/or the like executing one or more secure applications requiring authentication of the user 206, for example, a device login (unlock), a digital wallet, a banking application, a shopping application and/or the like. The secure applications may further include one or more secure web sites requiring authentication of the user 206, for example, a bank account website, a credit card website, a private website and/or the like. The secure web site(s) may be accessed from the secure general purpose device using one or more web browsers and/or local agents executed by the secure general purpose device. The secure resource may further include one or roe user interfaces, for example, a keyboard, a pointing device, a touchscreen, a touchpad, a microphone, a speaker and/or the like for interacting with the user 206.

According to some embodiments of the present invention, as shown at 200A, an exemplary authentication system 202 configured to authenticate the user 206 attempting to access the secure resource 204 is separated from the secure resource 204. Such deployment may apply in particular to the application specific devices, systems and/or platforms such as, for example, the passport control system, the ATM, the automated kiosk, the vending machine, the door digital lock and/or the like.

The authentication system 202, for example, a computer, a server, a computing node, a cluster of computing nodes and/or the like may include an Input/Output (I/O) interface 210, a processor(s) 212 for executing a process such as the process 100 and a storage 214 for storing code and/or data.

The I/O interface 210 may include one or more wired and/or wireless network interfaces, for example, a Local Area Network (LAN) interface, a Wireless LAN (WLAN, e.g. Wi-Fi) interface, a Radio Frequency (RF) interface a Universal Serial Bus (USB), a Controller Area Network (CAN) bus interface and/or the like for connecting to the secure resource 204.

Through the I/O interface 210, the authentication system 202 may further connect to one or more sensors 208 adapted to capture sensory data depicting the user 206. Specifically the sensor(s) 208 are configured to capture biometric data of the user 206 used by one or more biometric verification technologies for verifying the biometric signature of the user 206, for example, fingerprint matching, face recognition, iris recognition, retinal matching, ear matching, voice recognition, hand written signature matching and/or the like. The sensor(s) 208 may therefore include one or more sensors selected and/or configured according to the biometric verification technology(s) used for authenticating the biometric signature of the user 206, for example, an imaging sensor (e.g. a camera, a video camera, etc.), an audio sensor (e.g. a microphone, etc.), a fingerprint scanner, a tactile sensor (e.g. a touch pad, a touch screen, etc.) and/or the like.

Optionally, one or more of the sensors 208 is integrated in the secure resource 204. In such cases the authentication system 200 communicating with the secure resource 204 via the I/O interface 210 may obtain from the secure resource 204 the sensory data, specifically the biometric data captured by the integrated sensor(s) 208.

The processor(s) 212, homogenous or heterogeneous, may include one or more processing nodes arranged for parallel processing, as clusters and/or as one or more multi core processor(s). The storage 214 used for storing data and/or code (program store) may include one or more non-transitory memory devices, either persistent non-volatile devices, for example, a hard drive, a solid state drive (SSD), a magnetic disk, a Flash array and/or the like. The storage 214 may also include one or more volatile devices, for example, a Random Access Memory (RAM) device, a cache memory and/or the like. The storage 214 may further comprise one or more local and/or remote network storage resources, for example, a storage server, a Network Attached Storage (NAS), a network drive, and/or the like accessible via one or more networks through the I/O interface 210.

The processor(s) 212 may execute one or more software modules, for example, a process, a script, an application, an agent, a utility, a tool and/or the like each comprising a plurality of program instructions stored in a non-transitory medium such as the storage 214 and executed by one or more processors such as the processor(s) 212. For example, the processor(s) 212 may execute a biometric signature verifier 220 for analyzing the biometric data captured during the biometric authentication process and verifying the biometric signature of the user 206. The processor(s) 212 may further execute an authenticator 222 for verifying compliance of the authentication process parameters measured during the biometric authentication process against a biometric signature authentication process model 224 of the user 206. The biometric signature authentication process model 224 of the user 206 may be stored locally in the authentication system 202, for example, in the storage 214.

Optionally, the biometric signature authentication process model 224 of the user 206 is stored in one or more remote network resources 240, for example, a server, a processing node, a cloud service, cloud storage and/or the like. In such case, the I/O interface 210 of the authentication system 202 may further include one or more wired and/or wireless network interfaces for connecting to a network 230 to support communication with the remote network resource(s) 240 for accessing, retrieving and/or receiving the biometric signature authentication process model 224. The network 230 may include one or more networks, for example, a LAN, a WLAN, a Municipal Area Network (MAN), a cellular network, the internet and/or the like.

According to some embodiments of the present invention, as shown at 200B, the authentication system 202 configured to authenticate the user 206 attempting to access the secure resource 204 is integrated in the secure resource 204. Such deployment may apply in particular to the general purpose devices such as, for example, the Smartphone, the tablet, the handheld computer, the laptop computer, the desktop computer and/or the like.

The secure resource 204 integrated with the authentication system may include an I/O interface 250 such as the I/O interface 210, a processor(s) 252 such as the processor(s) 212 and a storage 254 such as the storage 214. The secure resource 204 may further include a user interface 250 comprising one or more user interfaces for interacting with the user 206, for a keyboard, a pointing device (e.g. a mouse, a touchpad, a trackball, etc.), a touchscreen, a microphone, a speaker and/or the like. In such embodiments, the secure resource 204 may further integrate one or more of the sensor(s) 208.

The processor(s) 252 may execute the biometric signature verifier 220 for verifying the biometric signature of the user 206 and the authenticator 222 for verifying compliance of the authentication process parameters. The biometric signature authentication process model 224 of the user 206 may be stored in the storage 254.

Optionally, as described for the system 200A, the biometric signature authentication process model 224 of the user 206 is stored in the remote network resource(s) 240. The authenticator 222 may access, retrieve and/or receive the biometric signature authentication process model 224 from the remote network resource(s) 240 via the network 230 through the I/O interface 250.

As shown at 102, the process 100 starts with the authenticator 222 receiving the sensory data, specifically biometric data of a user 206 captured one or more of the sensors 208. The user 206 attempting to access the secure resource 204 needs to be authenticated first in order to verify the identity of the user 206 before granting the user 206 access to the secure resource 204.

The authentication process may be a biometric authentication process in which the sensor(s) 208 may be operated to capture (acquire) the biometric data of the user 206, for example, one or more images, one or more voice recordings, one or more fingerprint maps and/or the like. The biometric authentication process may be based on one or more of the biometric verification technology(s), for example, fingerprint matching, face recognition, iris recognition, retinal matching, ear matching, voice recognition, hand written signature matching and/or the like. The biometric verification technology(s) are applied to verify one or more biometric signatures associated with the user 206, for example, a fingerprint, a face pattern, an iris pattern, a retinal pattern, an ear pattern, a voice pattern and/or the like.

The biometric signature verification may be done by the biometric signature verifier 220 which may analyze the captured biometric data according to the applied biometric verification technology(s) and compare it to biometric signature(s) associated with the user 206.

The authenticator 222 may receive the same sensory data captured by the sensor(s) 208 used by the biometric signature verifier 220 for verifying the biometric signature(s) such that no additional sensory data beyond the sensory data captured for the biometric signature(s) verification needs to be captured by the sensor(s) 208.

As shown at 104, the authenticator 222 may calculate values of one or more biometric data authentication process parameters measured during analysis of the biometric data either by the biometric signature verifier 220 and/or by the authenticator 222. The authentication process parameters may relate to one or more aspects of the biometric data analysis.

For example, the authentication process parameters may relate to one or more features extracted from the sensory (biometric) data, specifically features which are used by the biometric signature verifier 220 for verifying the biometric signature(s). The features may naturally depend on the biometric verification technology(s) and/or on the type of the sensor(s) 208 capturing the biometric data. For example, assuming the biometric verification is based on face recognition, iris recognition, retinal scan, ear recognition and/or the like, an imaging type sensor(s) 208 may capture one or more images of the face, eye(s) and/or ear(s) respectively of the user 206. The features extracted from the image(s) may thus include visual features (e.g. curvatures, lines, shapes, distances, etc.) representing the face, iris(s), retina(s) and/or ear(s) of the user 206. In another example, assuming the biometric verification is based on fingerprint matching, a fingerprint scanner type sensor(s) 208 may capture one or more fingerprint maps of one or more fingers of the user 206. The features extracted from the fingerprint map(s) may thus include, for example, curvature features (e.g. lines, curves, minutiae, etc.) representing the fingerprint(s) of the user 206. In another example, assuming the biometric verification is based on voice recognition, a microphone type sensor(s) 208 may capture one or more voice recordings of the user 206. The features extracted from the fingerprint map(s) may thus include audible features (e.g. frequency, pitch, vocal range, volume, speed of speech, intonation, accent, etc.) representing the voice of the user 206. In another example, assuming the biometric verification is based on hand written print matching, a touch surface type sensor(s) 208 (e.g. touch screen, touch pad, etc.) may capture one or maps of hand written signatures signed by the user 206 using his finger, using a touch pen (stylus pen) and/or the like. The features extracted from the written signature(s) map(s) may thus include, for example, curvature features, dot features, stroke features and/or the like representing the written signature(s) of the user 206.

In another example, the authentication process parameters may relate to one or more intermediary feature extracted from the sensory data. The intermediary feature(s) may be features which are detected and/or calculated during the analysis of the biometric data but may not necessarily be used for the verification of the biometric signature(s). The intermediate features may include, for example, a background visual feature, an illumination level, a background audible feature, a dynamic feature changing during capture of the sensory data and/or the like. Such intermediate features may be available to the authenticator 222 as they may be extracted from the sensory data for detection, extraction, construction and/or calculation of the (final) features used for verifying the biometric signature(s).

In another example, the authentication process parameters may relate to one or more interaction characteristics identified for the interaction of the user 206 with the sensor(s) 208 during the biometric authentication process. For example, assuming the biometric verification is based on the face recognition, iris recognition, retinal scan, ear recognition and/or the like in which the imaging type sensor(s) 208 captures one or more images of the face of the user 206 and/or part(s) thereof. In such case, the interaction characteristics may include, for example, an angle of the head of the user with respect to the imaging type sensor(s) 208 (e.g. tilt, rotation, yaw, etc.), a distance of the head from the imaging type sensor(s) 208, an elevation of the head with respect to the imaging type sensor(s) 208 and/or the like. In another example, assuming the biometric verification is based on the fingerprint match with the fingerprint scan type sensor(s) 208 capturing the fingerprint map of the finger(s) of the user 206. In such case, the interaction characteristics may include, for example, a pressure applied by the finger(s) on the fingerprint scan type sensor(s) 208, a rapidness of placing and/or removing the finger(s) on the fingerprint scan type sensor(s) 208, an angle (tilt, rotation, etc.) of the finger(s) with respect to the fingerprint scan type sensor(s) 208, a location of the finger(s) on the fingerprint scan type sensor(s) 208 and/or the like. In another example, assuming the biometric verification is based on the hand written signature match with the touch surface type sensor(s) 208 capturing the maps of hand written signature(s). In such case, the interaction characteristics may include, for example, a thickness of a tip of the finger and/or of the touch pen, a pressure applied by the user 206 on the touch surface type sensor(s) 208, a rapidness of writing the signature(s) on the touch surface type sensor(s) 208, an angle of the finger and/or the touch pen with respect to the touch surface type sensor(s) 208, a location of the hand written signature on the touch surface type sensor(s) 208 and/or the like.

In another example, the authentication process parameters may relate to one or more execution flow attributes of the biometric signature verifier 220 and/or of the authenticator 222 during analysis of the sensory data (biometric data). While analyzing the sensory data, the execution flow of the biometric signature verifier 220 and/or of the authenticator 222 may depend on the captured sensory data. As such one or more attributes of the execution flow may vary and/or change depending on the captured sensory data. For example, a certain routine of the biometric signature verifier 220 and/or the authenticator 222 may be executed in case a certain data element is detected in the captured sensory data. In another example, a certain variable value may be set by the biometric signature verifier 220 and/or the authenticator 222 according to a certain data element detected in the captured sensory data. In another example, a certain library function may be called by the biometric signature verifier 220 and/or the authenticator 222 in case a certain data element is detected in the captured sensory data.

As shown at 106, the authenticator 222 may calculate a deviation of the values measured for one or more of the authentication process parameters during the analysis of the biometric data compared to values of corresponding reference authentication process parameters retrieved from the biometric signature authentication process model 224 of the user 206. As described herein before, the authenticator 222 may retrieve the biometric signature authentication process model 224 of the user 206 from the storage 214 or the storage 254 in case of the integrated secure terminal 204 and/or from the remote network resource(s) 240.

The biometric signature(s) may be created for the user 206 during an enrollment process conducted by the user 206 for enrolling (registering) for the service and/or device accessed using the secure resource 204. For example, the enrollment process may be a procedure held at a government institute for issuing a passport, a procedure held at a bank for issuing a credit card or opening a banking account and/or the lie. In another example, the enrollment process may be a procedure conducted by the user 206 for registering to a certain local and/or online service, application and/or the like. In another example, the enrollment process may be a procedure conducted by the user 206 for logging into the secure resource 204. During the enrollment process, the biometric data of the user 206 is captured to create the biometric signature(s) for the user 206.

The biometric signature authentication process model 224 may be created for the user 206 during a first authentication process conducted by the user 206 following the enrollment process for authenticating himself in order to gain access to the secure resource 204. A plurality of authentication process parameters may be measured during the analysis of the biometric data captured during the authentication process. Moreover, the measured authentication process parameters may be defined in the biometric signature authentication process model 224 as the reference authentication process parameters. Optionally, one or more of the authentication process parameters may also be assigned weights based on the analysis of the biometric data captured during the first authentication process. In the initial phase, the weights may be assigned according to predefined and/or default settings.

Optionally, the authenticator 222 assigns weights to one or more of authentication process parameter to indicate a significance of the respective authentication process parameter(s) to verification of acquisition and analysis of the biometric signature. As such, authentication process parameters having higher significance, reliability, consistency and/or the like may be assigned with larger weights to increase their contribution to the overall aggregated deviation. In contrast, authentication process parameters having lesser significance, reliability and/or the like may be assigned with smaller weights to reduce their contribution to the overall aggregated deviation. For example, assuming a certain authentication process parameter is an intermediate feature extracted during analysis of the biometric data, for example, an illumination level. The illumination level may depend on the environment and/or time the user 206 conducts the biometric authentication process. In some scenarios a certain user 206 may typically attempt to access the secure resource 24 during specific times of the day and/or at specific locations such that the illumination level during the authentication processes is relatively consistent. However the user 206 may deviate from the typical behavior such that the environment and/or time may be different for at least some biometric authentication processes (sessions) and the illumination level may therefore vary. The illumination level authentication process parameter may be therefore assigned a relatively small weight. In another example, assuming a certain authentication process parameter is an interaction characteristic identified during analysis of the biometric data, for example, a fingertip width of the finger of the user 206. Since the fingertip width may be substantially constant, the fingertip width authentication process parameter may be assigned a relatively large weight. In another example, assuming a certain authentication process parameter is an execution flow attribute of the biometric signature verifier 220, for example, a certain branch operation which occurs when the biometric signature verifier 220 positively authenticates a certain visual feature of the face of user 206. The certain branch operation authentication process parameter may be assigned a relatively large weight.

Optionally, the value of one or more of the reference authentication process parameters is updated, adjusted and/or adapted according to the analysis of the biometric data captured during one or more subsequent biometric authentication process following the first biometric authentication process. Moreover, the weight assigned to one or more of the reference authentication process parameters may also be updated, adjusted and/or adapted according to the analysis of the biometric data captured during one or more subsequent biometric authentication process following the first biometric authentication process. The weights may be defined according to successful and/or failed verification of the biometric signature of the user 206 by the biometric signature verifier 220. For example, during the analysis of one or more failed biometric signature verifications, the authenticator 222 may identify that the value of one or more of the authentication process parameters is highly indicative of a root cause for the biometric signature verification failure. In such case the authenticator 222 may assign a larger weight to the highly indicative authentication process parameter(s). The larger weight assigned to the highly indicative authentication process parameter(s) may therefore increase the overall aggregated deviation.

For example, assuming biometric signature verification is based on face recognition. Further assuming that during multiple subsequent biometric authentication processes, the authenticator 222 identifies that the user 204 tilts his head during the biometric authentication process at a certain angle with respect to the imaging type sensor(s) 208. The authenticator 222 may therefore set and/or adjust one or more authentication process parameters relating to the tilt angle to reflect the tilt angle typical to the user 206.

For example, assuming the biometric signature verification is based on fingerprint matching, one or more of the authentication process parameters may relate to features extracted from the fingerprint map which may represent, for example, one or more substantially stable minutiae of the finger of the user 206. The substantially stable minutiae may be expressed by values of one or more corresponding reference authentication process parameter. The authenticator 222 may calculate a deviation of the authentication process parameters measured for the stable minutiae compared to the corresponding reference authentication process parameter defined for the stable minutiae in the biometric signature authentication process model 224. In another example, assuming the biometric signature verification is fingerprint matching, one or more of the authentication process parameters may relate to features extracted from the fingerprint map which may represent, for example, one or more significantly varying minutiae of the finger of the user 206. The significantly varying minutiae may be expressed by values of one or more corresponding reference authentication process parameter. The authenticator 222 may calculate a deviation of the authentication process parameters measured for the varying minutiae compared to the corresponding reference authentication process parameter defined for the varying minutiae in the biometric signature authentication process model 224.

The authenticator 222 may further aggregate the deviation calculated for the authentication process parameters to produce an aggregated deviation of the measured values of the authentication process parameters compared to the values of the reference authentication process parameters.

Optionally, the authenticator 222 adjusts the value measured for one or more of the authentication process parameters according to a respective weight assigned to the respective authentication process parameter to indicate a significance of the respective authentication process parameter to verification of the acquisition and analysis of the biometric signature. As such, authentication process parameters having higher significance, reliability, consistency and/or the like may be assigned with larger weights to increase their contribution to the overall aggregated deviation. In contrast, authentication process parameters having lesser significance, reliability and/or the like may be assigned with smaller weights to reduce their contribution to the overall aggregated deviation. For example, assuming a certain authentication process parameter is an intermediate feature extracted during analysis of the biometric data, for example, an illumination level. The illumination level may depend on the environment and/or time the user 206 conducts the biometric authentication process. Since the environment and/or time may be different for different biometric authentication processes (sessions) and the illumination level may therefore vary, the illumination level authentication process parameter may be assigned a relatively small weight. In another example, assuming a certain authentication process parameter is an interaction characteristic identified during analysis of the biometric data, for example, a fingertip width of the finger of the user 206. Since the fingertip width may be substantially constant, the fingertip width authentication process parameter may be assigned a relatively large weight. In another example, assuming a certain authentication process parameter is an execution flow attribute of the biometric signature verifier 220, for example, a certain branch operation which occurs when the biometric signature verifier 220 positively authenticates a certain visual feature of the face of user 206. The certain branch operation authentication process parameter may be assigned a relatively large weight.

As shown at 108, which is a conditional step, the authenticator 222 may check whether the biometric signature of the user 206 is verified by the biometric signature verifier 220. In case the biometric signature verifier 220 successfully verifies the biometric signature of the user 206, the process 100 branches to 110. However, in case of failure of the biometric signature verifier 220 to verify the biometric signature of the user 206, the process 100 branches to 114.

As shown at 110, which is a conditional step, the authenticator 222 may determine whether the deviation, typically the aggregated deviation of the measured authentication process parameters from the reference authentication process parameters is acceptable or not. In other words, the authenticator 222 determines compliance or incompliance of the measured authentication process parameters with the reference authentication process parameters defined by the biometric signature authentication process model 224. For example, the authenticator 222 may check whether the aggregated deviation exceeds certain predefined threshold.

As shown at 112, in case the deviation is acceptable, i.e. the measured authentication process parameters comply with the reference authentication process parameters defined by the biometric signature authentication process model 224, the authenticator 222 may positively authenticate the user 206, i.e. the authentication of the user 206 is successful. In such case, the user 206 may be granted access to the secure resource 204.

As shown at 114, in case the biometric signature verifier 220 fails to verify the biometric signature of the user 206 or the authenticator 222 determines that the aggregated deviation is unacceptable, the authenticator 222 may indicate a failure of the biometric authentication of the user. In such case, the user 206 may be denied access to the secure resource 204. Optionally, the authenticator 222 outputs, generates and/or transmits an anomaly indication, for example, a message and/or the like in case the authenticator 222 determines that the aggregated deviation is unacceptable.

According to some embodiments of the present invention the authenticator 222 may calculate the deviation of the values by calculating a distance (difference) between the measured values of the authentication process parameter(s) from the values of the reference authentication process parameter(s) defined by the biometric signature authentication process model 224 of the user 206. For example, the authenticator 222 may express the distance as an absolute value expressing the distance between the measured value of a certain authentication process parameter and the value of a reference authentication process parameter. In another example, the authenticator 222 may express the distance as a percentage of the difference between the measured value of a certain authentication process parameter and the value of a reference authentication process parameter.

For example, continuing the previously presented example of the authentication process parameters relating to the substantially stable and the significantly varying minutiae identified in the fingerprint map captured for the finger of the user 206. The authenticator 222 may calculate whether the distance between the authentication process parameters relating to the substantially stable minutiae measured during the biometric authentication process and the corresponding reference authentication process parameters relating to the substantially stable minutiae exceeds certain threshold value. In case the distance exceeds the threshold value, the authenticator 222 may determine that the measured authentication process parameters relating to the substantially stable minutiae deviate from the biometric signature authentication process model 224. In case of the significantly varying minutiae, the authenticator 222 may determine that the measured authentication process parameters relating to the significantly varying minutiae deviate from the biometric signature authentication process model 224 in case there is insufficient variation in the intermediate features representing the significantly varying minutiae measured during the analysis of the fingerprint map(s).

According to some embodiments of the present invention the authenticator 222 employs one or more machine learning models and/or algorithms, for example, a neural network, an SVM and/or the like for calculating and detecting the deviation of the authentication process parameters measured during the biometric authentication process and the reference authentication process parameters. The neural network(s) may be implemented using one or more neural network implementations, for example, a DNN, a Feedforward neural network (e.g. convolutional neural networks, time delay neural networks, etc.), an RNN, a RBF and/or the like.

The machine learning model(s) may be adapted and customized for the user 206 by training the machine learning model(s) with a plurality of training datasets comprising simulation sensory data (biometric data) representative of sensory data captured during a plurality of biometric authentication processes of the (specific) user 206. The simulation sensory data of one or more of the training datasets may be include, for example, sensory data captured during a plurality of biometric authentication process conducted by the user 206. In another example, the simulation sensory data of one or more of the training datasets may be synthetically generated based on sensory data captured during a plurality of biometric authentication process conducted by the user 206. In another example, the simulation sensory data of one or more of the training datasets nay include a combination of actually captured sensory data and synthetically generated sensory data.

Each of the plurality training datasets may be annotated with a label indicating success or failure of the respective biometric authentication process to which the simulation data of the respective training dataset relates.

During the training, the machine learning model(s) may adjust according to corresponding authentication process parameters detected during analysis of the simulation sensory data such that the machine learning model(s) facilitate the biometric signature authentication process model 224. Moreover, based on the label assigned to each of the training datasets, the machine learning model(s) may adjust the values and/or weights assigned to the authentication processes parameters according to values associated with failed authentication processes and vice versa, adjust the values and/or weights according to values of authentication process parameters associated with successful authentication processes. As such the machine learning model(s) are trained to detect authentication process parameters and their respective contribution (weight) characteristic (typical) to successful authentication processes. Similarly, the machine learning model(s) are trained to detect authentication process parameters and their respective contribution (weight) characteristic (typical) to failed authentication processes.

For example, assuming the machine learning model(s) is implemented using one or more neural networks. During the training, the neural network(s) may adjust its layers, nodes and/or weights according to the corresponding authentication process parameters detected during analysis of the simulation sensory data such that the neural network(s) facilitates the biometric signature authentication process model 224. Moreover, based on the label assigned to the training datasets, the neural network(s) may adjust its layers, nodes and/or weights to detect the authentication process parameters characteristic (typical) to the successful authentication processes as well as the authentication process parameters characteristic to the failed authentication processes. In another example, assuming the machine learning model(s) is implemented using one or more SVMs. During the training, the SVM(s) may automatically adjust according to corresponding authentication process parameters detected during analysis of the simulation sensory data such that the SVM(s) facilitates the biometric signature authentication process model 224. Similarly to the neural network(s), the SVM(s) may be adjusted to detect the authentication process parameters typical to the successful authentication processes as well as the authentication process parameters typical to the failed authentication processes.

During the biometric authentication process, the authenticator 222 may apply the trained machine learning model(s) to the measured authentication process parameters. The authenticator 222 may analyze the output of the machine learning model(s) to determine whether the measured authentication process parameters comply or deviate from the biometric signature authentication process model 224 represented by the machine learning model(s). For example, assuming the machine learning model(s) is implemented using one or more neural networks, the authenticator 222 may analyze the output from the last layer of the neural network(s). In another example, assuming the machine learning model(s) is implemented using one or more SVMs, the authenticator 222 may analyze the output of the SVM(s).

Optionally, the trained machine learning model(s) automatically adjust one or more of the weights associated with respective authentication process parameter(s) according to the values measured for at least some of the authentication process parameter(s) during one or more of the subsequent authentication processes succeeding the training session. For example, in the case of the trained neural network(s), the weights associated with respective authentication process parameter(s) may be expressed by weighted edges connecting the nodes of the neural network(s). In such case, the neural network(s) may adjust the values of the weighted edges associated with respective authentication process parameter(s) according to the values measured for at least some of the authentication process parameter(s) during one or more of the subsequent authentication processes succeeding the training session.

Moreover, in some implementation of the authentication system 202, the biometric signature may be verified using one or more other trained neural networks. In such cases the trained machine learning model(s) used to calculate the deviation of the measured authentication process parameters from the reference authentication process parameters may be applied to one or more features of the trained neural network(s) used for verifying the biometric signature. For example, the machine learning model(s) used to calculate the deviation may be applied to the values resulting at the final layer of the neural network(s) to calculate the deviation of the resulting values compared to the resulting values measured and/or learned from one or more previous authentication processes. In another example, the trained machine learning model(s) may be applied to probability values resulting at the final layer of the trained neural network(s) used for verifying the biometric signature to calculate the deviation of the probability values compared to probability values resulting at the final layer as measured and/or learned from one or more previous authentication processes.

It is expected that during the life of a patent maturing from this application many relevant systems, methods and computer programs will be developed and the scope of the terms machine learning model and/or algorithm, neural network and model architecture are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of authenticating a user based on comparison of biometric data authentication process parameters measured during a biometric authentication process against a biometric signature authentication process model of the user, comprising:

using at least one processor for:
receiving sensory data captured by at least one sensor operated to capture biometric data of a user during a biometric authentication process conducted to verify a biometric signature of the user, said biometric signature is an outcome of an analysis of said sensory data;
calculating a deviation of values of a plurality of authentication process parameters measured during at least one of acquisition and analysis of the sensory data, from the values of corresponding reference authentication process parameters retrieved from a biometric signature authentication process model of the user, said plurality of authentication process parameters describing said biometric data acquisition and analysis process other than said outcome; and
authenticating the user based on verification of the biometric signature and according to the deviation,
wherein at least one of said plurality of authentication process parameters relates to at least one interaction characteristics identified for an interaction of the user with said at least one sensor during said biometric authentication process; and
wherein when said at least one sensor is an imaging sensor, said at least one interaction characteristic is a member of a group consisting of:
an angle of a head of the user with respect to the imaging sensor,
a distance of the head from the imaging sensor and
an elevation of the head with respect to the imaging sensor.

2. The method of claim 1, wherein the biometric signature is verified using at least one biometric verification technology which is a member of a group consisting of: fingerprint matching, face recognition, iris recognition, retinal matching, ear matching, voice recognition and hand written signature matching.

3. The method of claim 1, wherein each of the plurality of authentication process parameters is a member of a group consisting of: a parameter relating to at least one feature of the biometric signature extracted from the sensory data, at least one intermediary feature extracted from the sensory data, a parameter of interaction with the user during the biometric authentication process and an execution flow attribute of the at least one processor during the biometric authentication process.

4. The method of claim 1, further comprising the deviation is calculated according to a weighted value of at least one of the at least some authentication process parameters, the weighted value is created by adjusting the value of the respective authentication process parameter according to a respective weight indicative of a significance of the respective authentication process parameter to verification of authentication process of the biometric signature.

5. The method of claim 1, wherein the biometric signature authentication process model is initially constructed for the biometric authentication process during a first biometric authentication process following an enrollment process conducted by the user.

6. The method of claim 5, further comprising the biometric signature authentication process model is adjusted according to at least one of a plurality of authentication process parameters measured during analysis of the sensory data captured during at least one subsequent biometric authentication process following the first biometric authentication process.

7. The method of claim 5, further comprising automatically adjusting a weight associated with at least one of the authentication process parameters, the weight is indicative of a significance of the respective authentication process parameter to verification of acquisition of the biometric signature, the weight is adjusted according to at least one of a plurality of authentication process parameters measured during analysis of the sensory data captured during at least one subsequent biometric authentication process following the first biometric authentication.

8. The method of claim 1, wherein the deviation is calculated by calculating a distance between the value measured for each of at least some of the plurality of authentication process parameters and the value of the corresponding reference authentication process parameter.

9. The method of claim 1, wherein the biometric signature authentication process model is utilized by at least one machine learning model trained to identify a deviation of the values of the plurality of authentication process parameters, the at least one machine learning model learns to identify the deviation during a training process in which the at least one machine learning model is trained with a plurality of training datasets comprising simulation sensory data representative of sensory data captured during a plurality of biometric authentication processes of the user.

10. The method of claim 9, wherein the at least one machine learning model is a member of a group consisting of: a neural network and a Support Vector Machine (SVM).

11. The method of claim 9, wherein each of the plurality of training datasets is annotated with a label indicating success or failure of the biometric authentication process based on the verification of the sensory data of the respective training dataset.

12. The method of claim 9, further comprising calculating the deviation by applying the at least one trained machine learning model to at least some features of at least one neural network used to verify the biometric signature.

13. A system for authenticating a user based on comparison of biometric data authentication process parameters measured during a biometric authentication process against a biometric signature authentication process model of the user, comprising:
a program store storing a code; and
at least one processor coupled to the program store for executing the stored code, the code comprising:
code instructions to receive sensory data captured by at least one sensor operated to capture biometric data of a user during a biometric authentication process conducted to verify a biometric signature of the user, said biometric signature is an outcome of an analysis of said sensory data;
code instructions to calculate a deviation of values of a plurality of authentication process parameters measured during at least one of acquisition and analysis of the sensory data, from the values corresponding reference authentication process parameters retrieved from a biometric signature authentication process model of the user, said plurality of authentication process parameters describing said biometric data acquisition and analysis process other than said outcome; and
code instructions to authenticate the user based on verification of the biometric signature and according to the deviation,
wherein at least one of said plurality of authentication process parameters relates to at least one interaction characteristics identified for an interaction of the user with said at least one sensor during said biometric authentication process; and
wherein when said at least one sensor is an imaging sensor, said at least one interaction characteristic is a member of a group consisting of:
an angle of a head of the user with respect to the imaging sensor,
a distance of the head from the imaging sensor and
an elevation of the head with respect to the imaging sensor.

14. A computer program product for authenticating a user based on comparison of biometric data authentication process parameters measured during a biometric authentication process against a biometric signature authentication process model of the user, comprising:
a non-transitory computer readable storage medium;
first program instructions for receiving sensory data captured by at least one sensor operated to capture biometric data of a user during a biometric authentication process conducted to verify a biometric signature of the user, said biometric signature is an outcome of an analysis of said sensory data;
second program instructions for calculating a deviation of values of a plurality of authentication process parameters measured during at least one of acquisition and analysis of the sensory data, from the values of corresponding reference authentication process parameters retrieved from a biometric signature authentication process model of the user, said plurality of authentication process parameters describing said biometric data acquisition and analysis process other than said outcome; and
third program instructions for authenticating the user based on verification of the biometric signature and according to the deviation;
wherein the first, second and third program instructions are executed by at least one processor from the non-transitory computer readable storage medium;
wherein at least one of said plurality of authentication process parameters relates to at least one interaction characteristics identified for an interaction of the user with said at least one sensor during said biometric authentication process; and
wherein when said at least one sensor is an imaging sensor, said at least one interaction characteristic is a member of a group consisting of:
an angle of a head of the user with respect to the imaging sensor,
a distance of the head from the imaging sensor and
an elevation of the head with respect to the imaging sensor.

15. The method of claim 1, wherein at least one of said plurality of authentication process parameters relates to at least one execution flow attribute of said analysis of said sensory data.

16. The method of claim 1, wherein said user is authenticated only when said biometric signature is verified and said plurality of authentication process parameters are determined as compliant with said corresponding reference authentication process parameters retrieved from said biometric signature authentication process model of the user.

* * * * *